No. 856,120. PATENTED JUNE 4, 1907.
C. WILLIAMS.
MULTICOLOR PRESS.
APPLICATION FILED SEPT. 17, 1904.

7 SHEETS—SHEET 1.

Witnesses
Harry B. White
Ray White.

Inventor:
Charles Williams
By Coburn & McRoberts
his Atty's

No. 856,120. PATENTED JUNE 4, 1907.
C. WILLIAMS.
MULTICOLOR PRESS.
APPLICATION FILED SEPT. 17, 1904.

7 SHEETS—SHEET 5.

Witnesses:
Harry R. L. White
Ray J. White

Inventor
Charles Williams
By Coburn & McRoberts
his Attys.

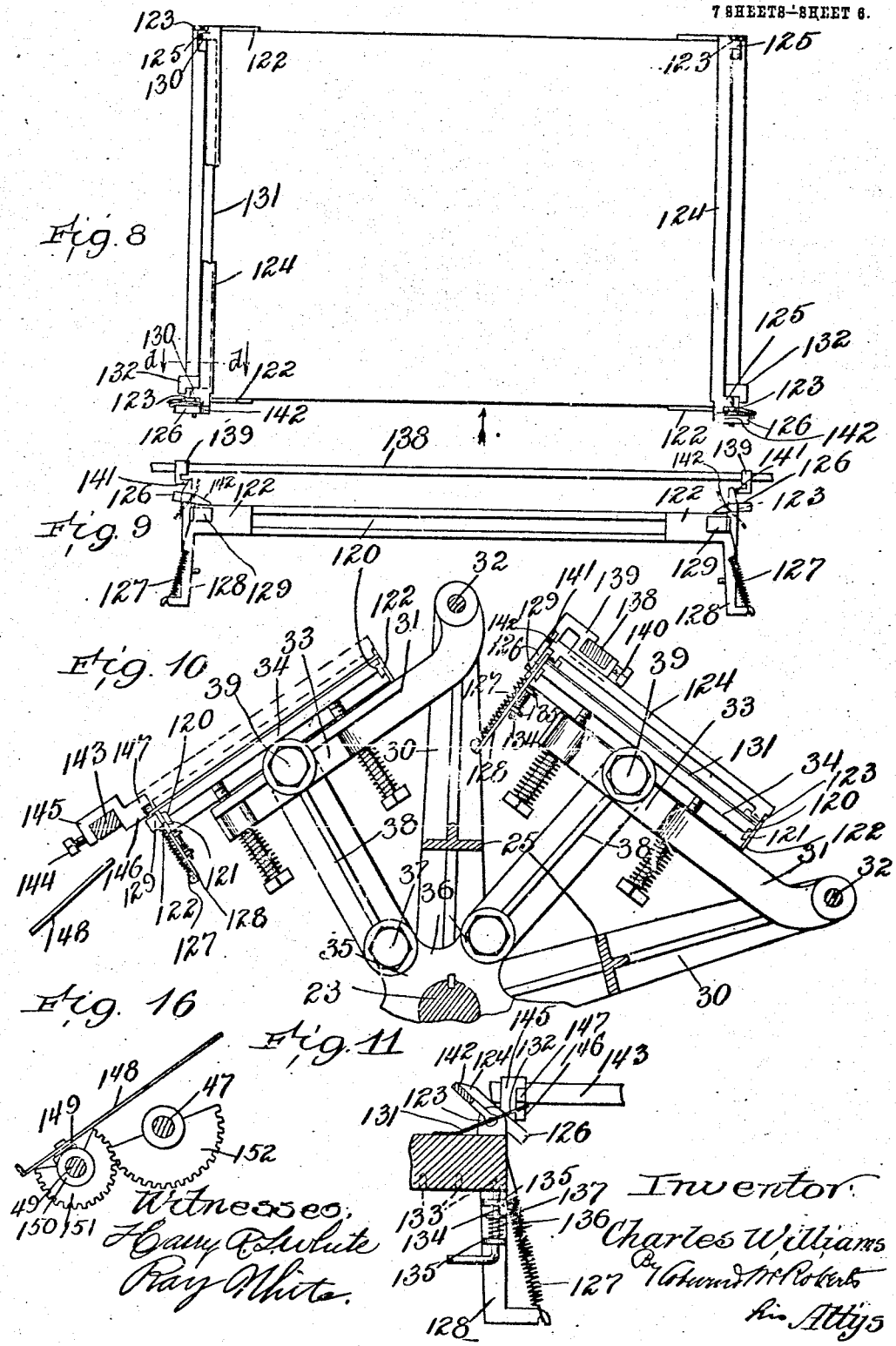

No. 856,120. PATENTED JUNE 4, 1907.
C. WILLIAMS.
MULTICOLOR PRESS.
APPLICATION FILED SEPT. 17, 1904.
7 SHEETS—SHEET 7.
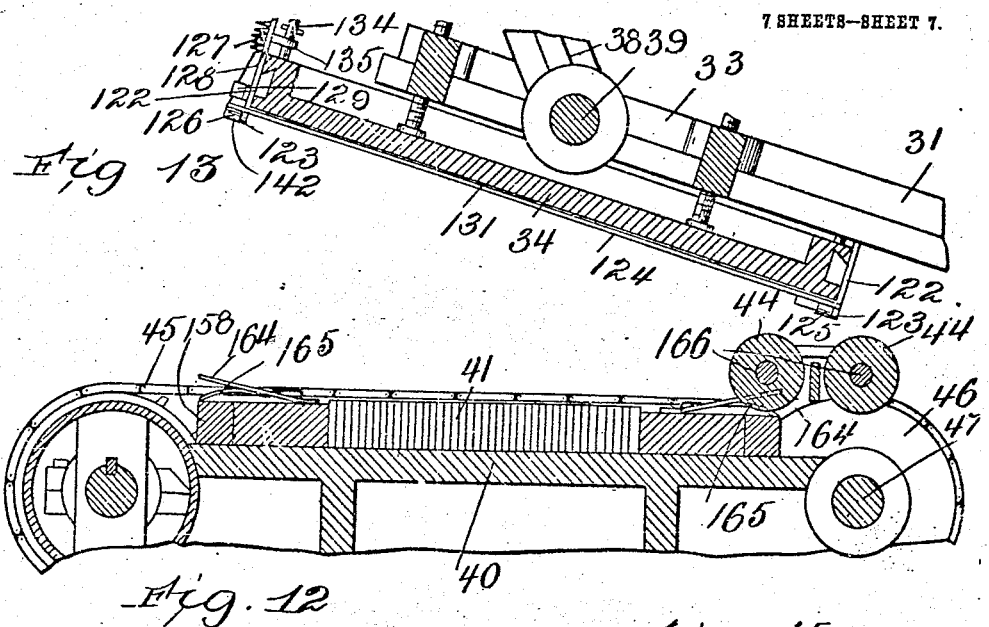
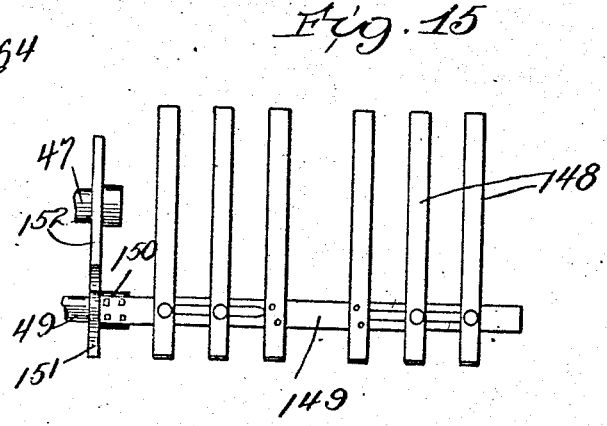
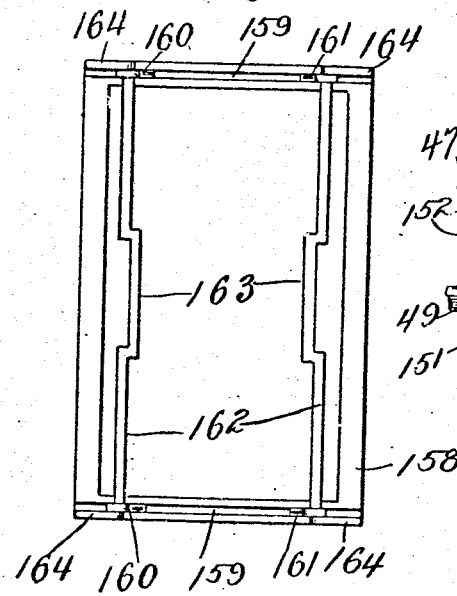
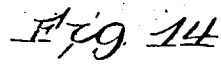
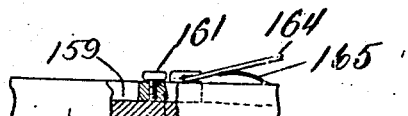
Witnesses:
Harry R. L. White
Ray White
Inventor:
Charles Williams
By Coburn & McRoberts
his Attys.

UNITED STATES PATENT OFFICE.

CHARLES WILLIAMS, OF CHICAGO, ILLINOIS, ASSIGNOR OF THREE-FOURTHS TO WILLIAM H. COWLES AND ONE-EIGHTH TO JOHN F. YOUNG, OF SPOKANE, WASHINGTON.

MULTICOLOR-PRESS.

No. 856,120.        Specification of Letters Patent.        Patented June 4, 1907.

Application filed September 17, 1904. Serial No. 224,788.

*To all whom it may concern:*

Be it known that I, CHARLES WILLIAMS, a citizen of the United States, residing at Chicago, in the county of Cook and State of Illinois, have invented certain new and useful Improvements in Multicolor-Presses, of which the following is a specification, reference being had therein to the accompanying drawing.

My invention has reference to printing presses and particularly relates to certain improvements in the multi-color printing press for which I obtained United States Letters Patent No. 813,124, dated February 20, 1906.

The invention consists of the combinations, arrangements and organizations of parts hereinafter particularly described and then pointed out in the appended claims.

To illustrate my invention I annex hereto seven sheets of drawings, in which—

Figure 1:
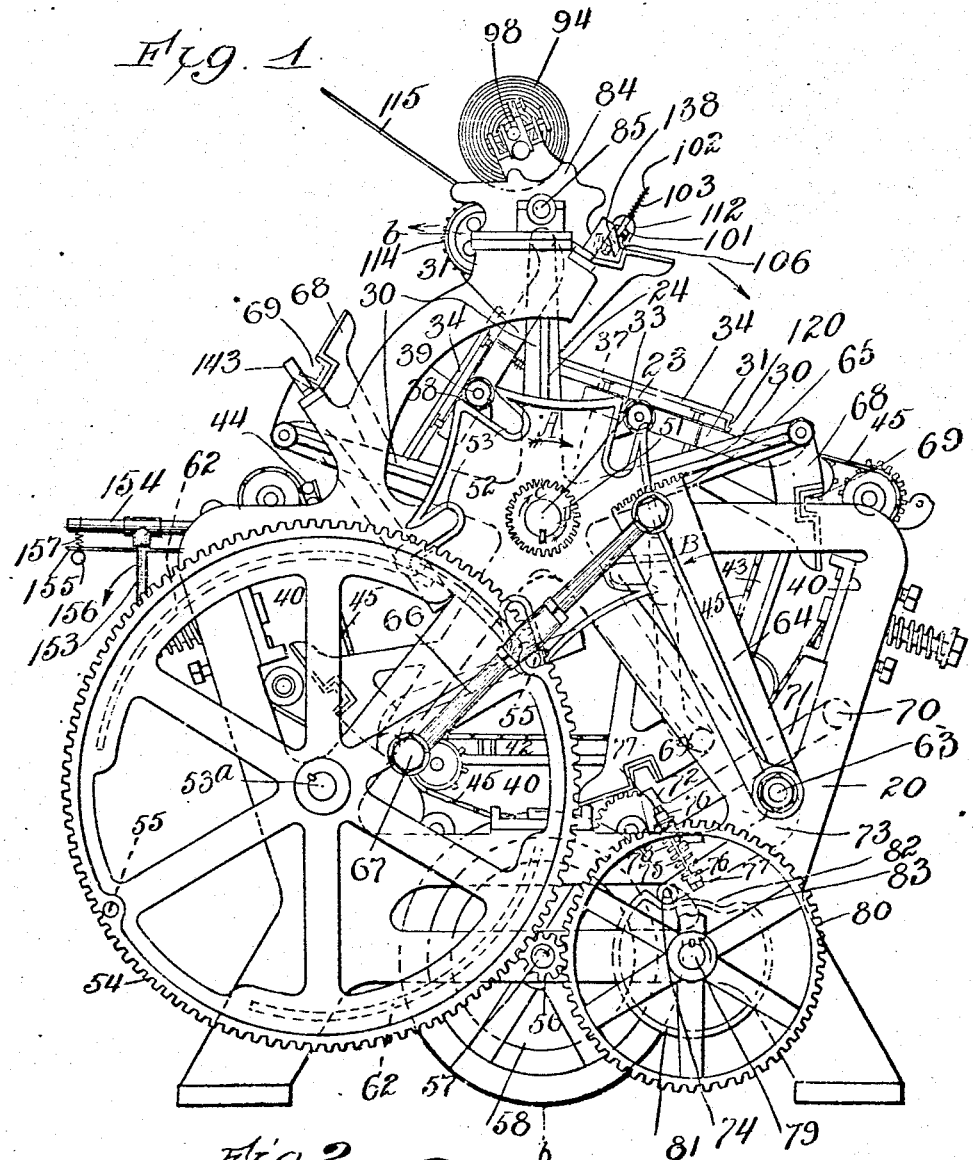
Figure 2:
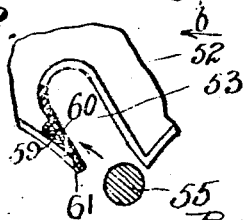
Figure 3:
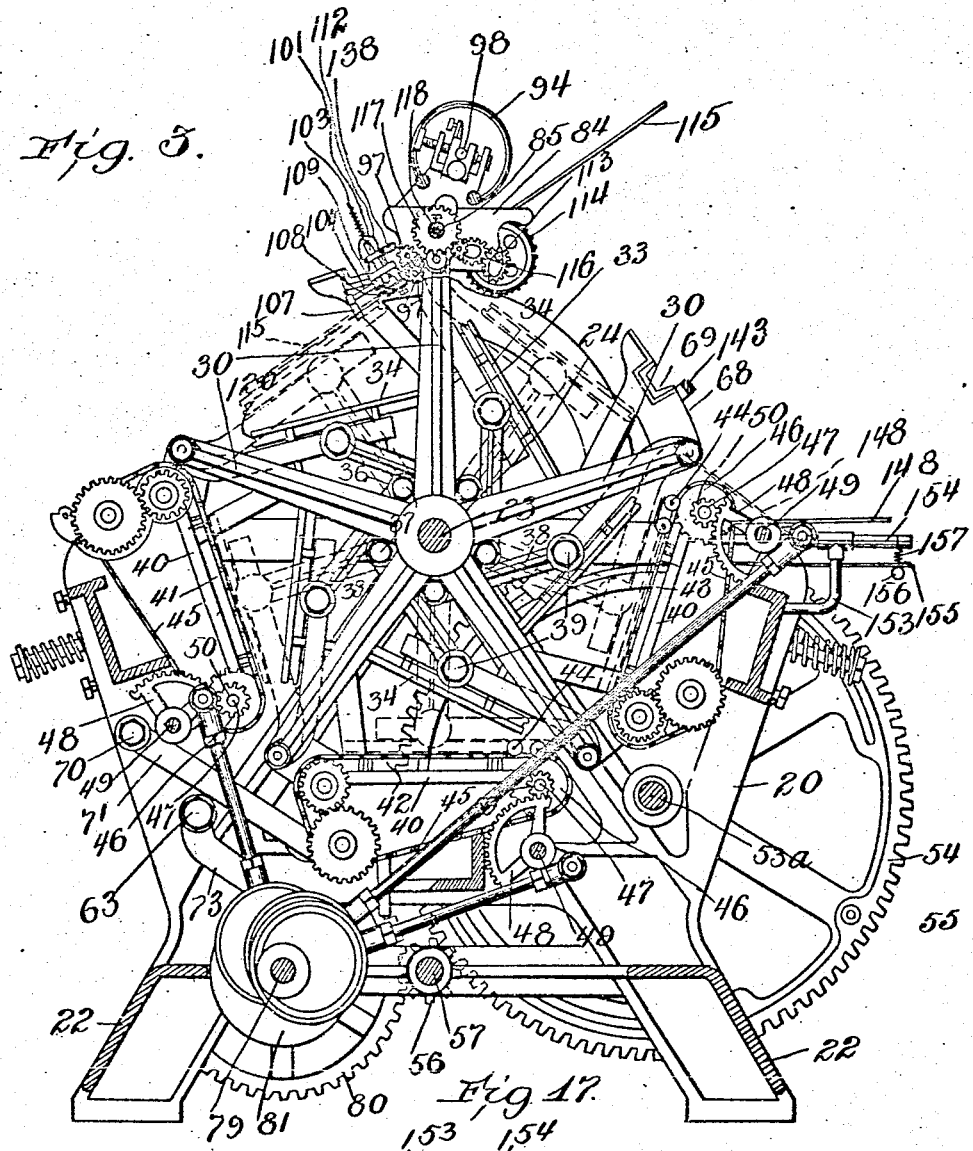
Figure 4:
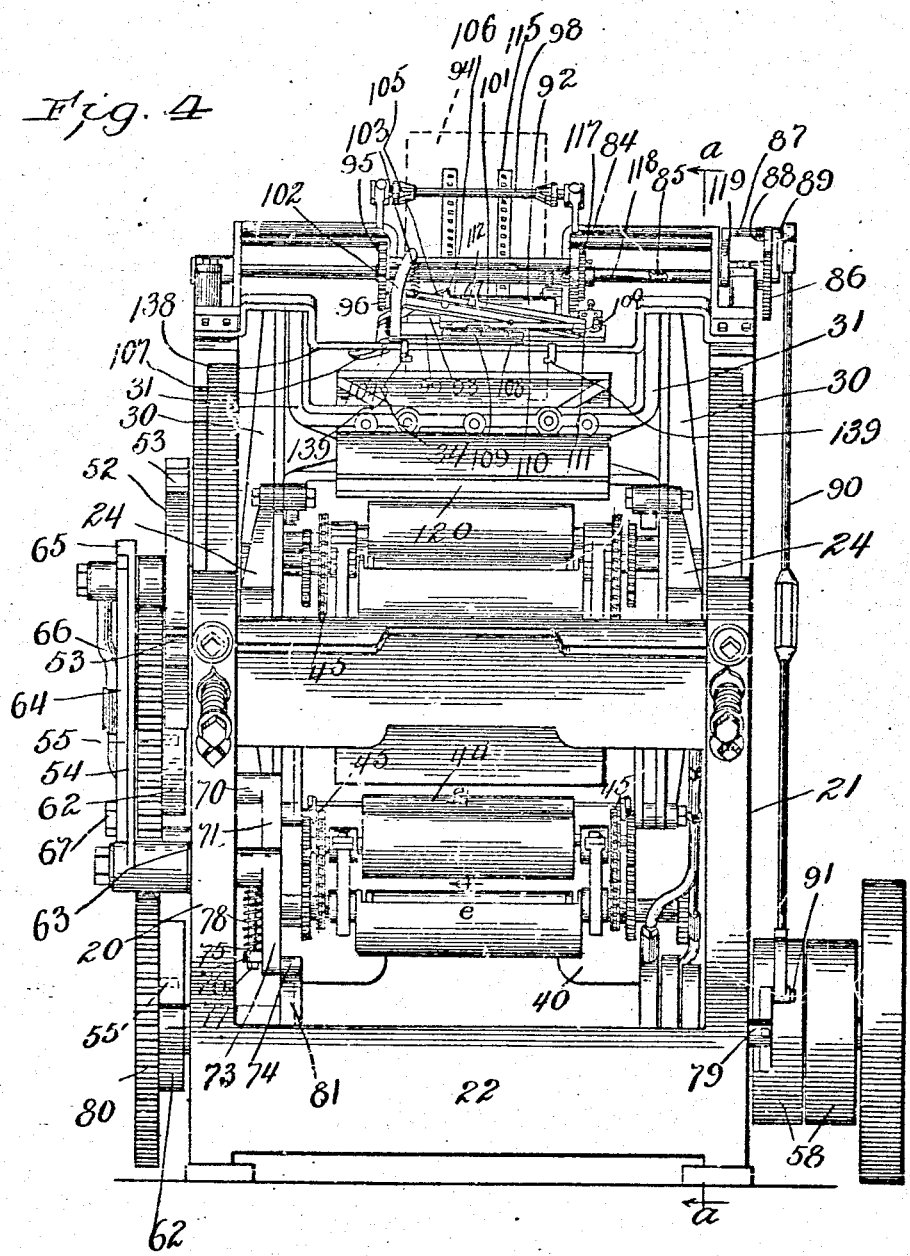
Figure 5:
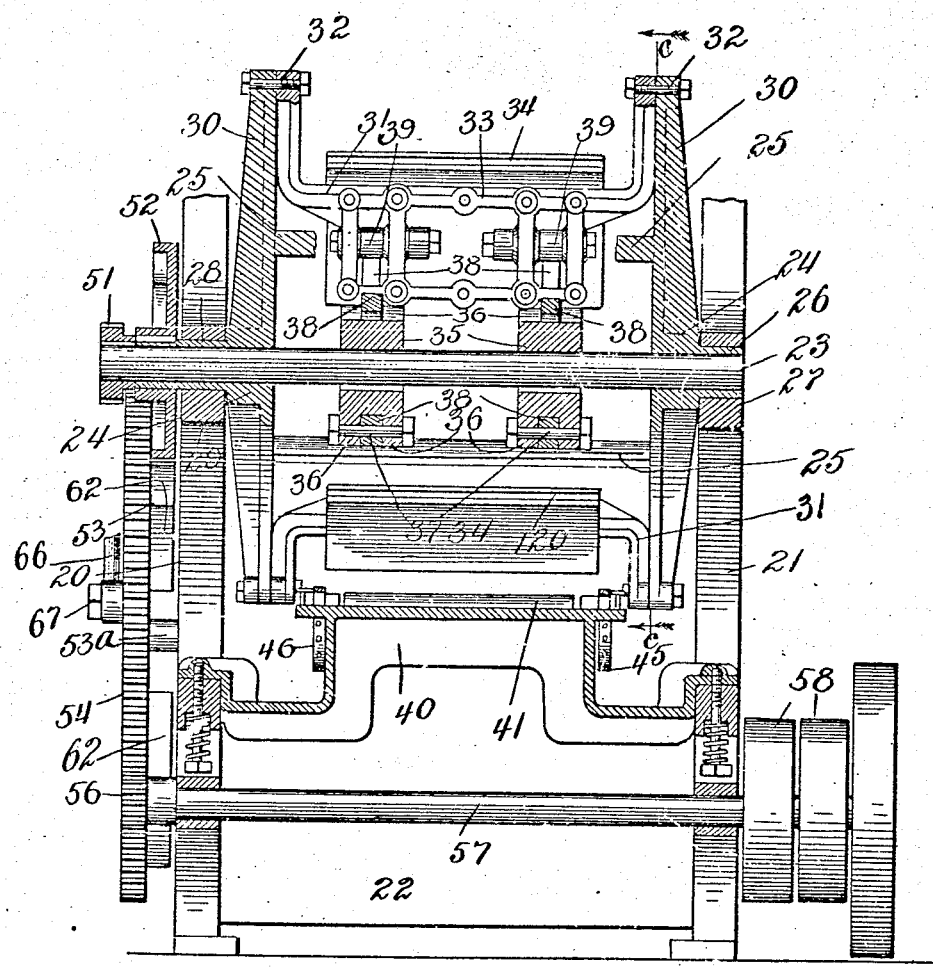
Figure 6:
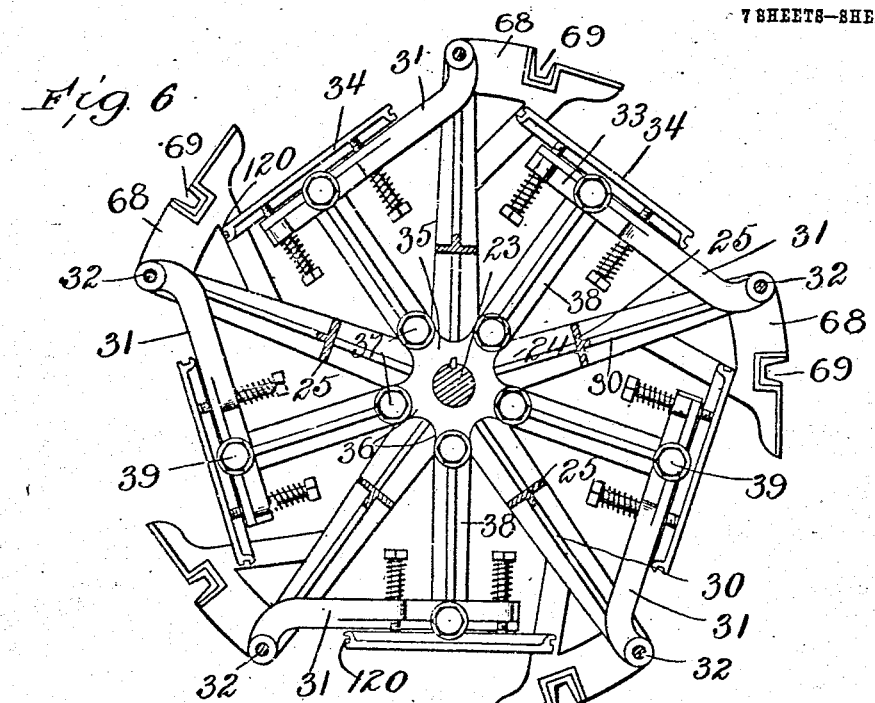
Figure 7:
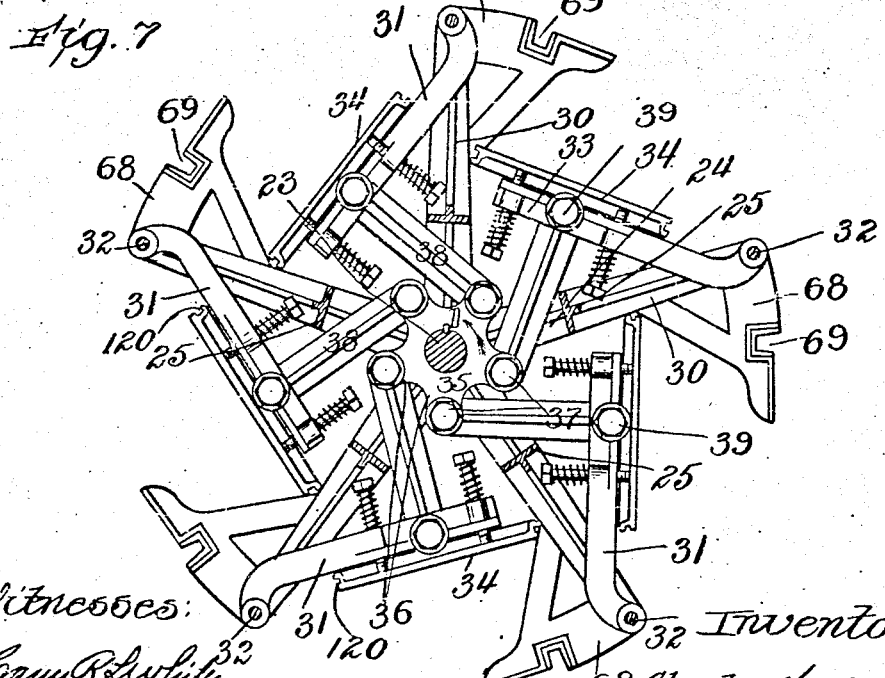

Figure 1 is a side elevation of the press, particularly illustrating the Geneva-stop connections for imparting intermittent rotary motion to the platen frame and the means for rocking the shaft to advance and retract the platens, and also the locking device for holding the frame against movement; Fig. 2 is a fragmentary view, partially in section, of the slotted disk of the Geneva-stop by means of which motion is communicated to the platen frame, the cam coöperating with such disk also being shown in section; Fig. 3 is a vertical section on the line *a—a* of Fig. 4; Fig. 4 is a front elevation of the press; Fig. 5 is a vertical transverse section on the line *b—b* of Fig. 1; Fig. 6 is a detail in section on the line *c—c* of Fig. 5 showing the platens at printing position; Fig. 7 is a similar view showing the platens in their retracted positions; Fig. 8 is a plan view of one of the platens and the sheet grippers thereof; Fig. 9 is a side elevation of the same looking in the direction of the arrow Fig. 8, and showing the cams for moving the grippers to release the sheet; Fig. 10 is a vertical detail section, on an enlarged scale, taken substantially on the same line as Figs. 6 and 7, showing the positions of the platens at the discharging and receiving points, and illustrating the relations of the cams for opening the grippers to release the sheet at the discharging point and for closing the grippers at the receiving point; Fig. 11 is a detail sectional view on the line *d—d* of Fig. 8, showing one of the cams coöperating with a gripper to open the same and also to rock the plate for freeing the sheet from the platen; Fig. 12 is a plan view of a chase showing the clamps thereon; Fig. 13 is a section on the line *e—e* of Fig. 4, illustrating the inking rollers and the relation thereto of the chase clamps, and also showing a platen; Fig. 14 is a side elevation of a fragment of the chase and one of the clamps, the chase being broken away to show one of the adjustable slides on which the clamp is mounted; Fig. 15 is a plan view of the delivery fly; Fig. 16 shows the driving connection for the fly; and Fig. 17 is a perspective of the fly board.

Referring to Figs. 1 to 5, inclusive, the frame of the machine consists of two standards 20 and 21 which are suitably spaced apart and connected by cross members 22 located at the base of the standards. In the present construction the standards and cross members are made of a single casting, although this is not material. Mounted on the standards is a shaft 23 the bearings of which are provided in the manner to be explained. The shaft 23 has loosely mounted thereon a frame which in the present instance comprises a pair of spiders 24 which are spaced apart by cross bars 25, as shown in Fig. 5, the frame, comprising the spiders and cross bars being preferably an integral casting. The spider adjacent to the standard 21 is provided with a hub 26 which extends into a bearing 27 in the said standard, while the spider adjacent the standard 20 is also provided with an extended hub 28 journaled in a bearing 29 in the standard 20. The hubs 26 and 28 provide bearings for the shaft 23 and the latter, as shown in Fig. 5, extends beyond the standard 20 as does also the extended hub 28. As shown in Figs. 1, 3, 6 and 7, the spiders 24 have five equi-distant and symmetrical arms 30 and one of the cross bars 25 is associated with and spaces apart each opposite pair of such arms. In addition to the cross bars 25 swinging yoke shaped platen supports 31 are employed, one of which, as will be seen by reference to Figs. 4 and 5, is journaled at its ends on bearing studs 32 on the outer ends of each opposite pair of the arms 30. The supports 31 are substantially U-shaped, and the widened central portion 33 of each serves as a support for a platen 34.

Keyed to the shaft 23 between the spiders 24 are disks 35 each of which is provided with five pair of equi-distant and symmetrical bearing ears 36 at the periphery thereof, each pair of ears of each disk being alined with a pair of such ears on the other disk. Pivoted on pins 37 mounted on each associated pair of ears 36 are links 38 whose outer ends are pivotally connected, as at 39, to an associated platen support 31. These disks 35 and links 38 provide a toggle connection by means of which when the shaft is rocked the platens are moved outwardly, as the toggle connections are straightened, to their printing positions, and are then returned or retracted.

Mounted on the standards 20, 21 are bed plates 40, upon which the type forms and inking mechanisms hereinafter described are designed to be mounted. These bed plates in the present instance are separated by angular spaces of 72 degrees so that the platens 34 will come in register therewith as they are moved through intervals of 72 degrees, and as the press in the embodiment illustrated is arranged for printing in three colors, three of such bed plates are shown to receive type forms 41, 42 and 43.

In connection with each bed plate 40 is a suitable inking mechanism such as that forming the subject matter of an application for United States Letters Patent filed by me June 27, 1904, Serial No. 214,229, and which comprises, generally, suitable inking rollers 44 which are adapted to be moved along the type surface and then returned during the intervals between impressions. These rollers 44 are carried by suitable chains 45 driven by sprocket wheels 46 mounted on shafts 47 suitably journaled on the bed plates 40 and having motion communicated thereto through the medium of segmental gears 48, fixed on shafts 49, also suitably journaled on the bed plates 40, and meshing with pinions 50 on the shafts 47, as more fully explained in the application for patent last referred to.

The platens 34, are designed to be rotated intermittently through a space of 72 degrees, then moved outwardly for printing, and then returned or moved inwardly to permit of their being carried by the rotation of the frame on which they are mounted to the next forms. In the present embodiment of the invention the intermittent movement of the platens is accomplished through the medium of the Geneva-stop mechanism now to be described.

Referring to Figs. 1 and 5, the shaft 23 has keyed to its end beyond the standard 20 a pinion 51, and fixed to the extended end of the hub 28 is a Geneva-stop disk or wheel 52 provided in the present instance with five peripheral recesses or slots 53. These slots, as shown in Figs. 1 and 2, are disposed tangentially and are symmetrical. Journaled on the side standards 20, 21, is a transverse shaft 53ª which has fixed thereto a gear 54. This gear is provided on its inner face at diametrically opposite points with a pair of cams which take the form of pins 55. These pins during the rotation of the gear 54 are brought in alternation successively into engagement with alternate slots of the disk 52 so as to turn the disk at each half rotation of the gear through the necessary angle of 72 degrees to move the platens successively into register with the forms 41, 42 and 43. The gear 54 is driven by a pinion 56 fixed on a drive shaft 57 journaled on the standards and provided with the usual fast and loose pulleys 58. The gear 54 turns in the direction of the arrow in Fig. 1, and as the pin 55 enters the mouth of the slot in the path of the same it moves into engagement with the wall of the slot so as to turn the disk. By arranging the slots 53 tangentially the pins 55 enter the same substantially in the direction of the length of the slots and engage the walls of the slots at an acute angle, thereby avoiding the impact that would otherwise result. The wall of the slot engaged by the pin may also be provided with a packing strip 59 of leather or other suitable material, seated in a recess in such wall and covered by a thin plate 60 of metal, such as steel, to avoid wear, the strip 59 and plate 60 being secured in position by screws, as shown in Fig. 2. The packing strip 59 serves to deaden the noise as the pin engages the wall of the slot when the press is running at high speed. Preferably the wall of the slot engaged by the pin is cut back as at 61, so that the pin becomes disengaged from such wall before the end of the 72 degrees movement is reached, the momentum of the platen carrying frame serving to carry the platens to the limit of the requisite 72 degrees movement, at which point the frame is engaged by the locking device hereinafter described. By thus utilizing the momentum of the machine to complete the movement of the platens the action is rendered more noiseless and the impact which would otherwise result were the frame driven positively to the point where it is arrested by the locking device, is eliminated.

The intervals in the periphery of the disk 52 between the slots 53 are concave as shown, and the gear wheel 54 is provided on its inner face with flanges 62 concentric with the axis of such gear and located at opposite points between the pins 55, as clearly shown in dotted lines in Fig. 1. These flanges are so disposed that one of the same moves under a concave portion of the disk 52 at the end of the movement of the platen carrying frame, and as the disk reaches the end of its movement such concave portion is concentric with the flange 62 the latter coöperating with the concave to hold the disk against further movement. The coöperation of the parts in this manner serves to hold the rotating frame against movement during the intervals between the intermittent rotary movements thereof and while the platens are being moved outwardly for printing.

Pivoted to the standard 20, as at 63 is an arm 64 provided at its free end with a segmental rack 65 adapted to mesh with the pinion 51. This rack is rocked through the medium of a link 66 which is pivoted at one end to the arm 64 and at its other end to a crank pin 67 on the gear 54. The swing of the rack 65 is such that on both its forward and backward movement it moves into and then out of engagement with the pinion 51, and while in engagement therewith turns the same through an angle of about 120 degrees, such movement being required to turn the shaft 23 far enough to thrust the platens out to their printing positions and then return the same; and by means of the arrangement shown the shaft 23 is rocked, or moved forward and then back, at each complete rotation of the gear 54.

As shown in Fig. 1, each of the arms 30 of the spider adjacent the standard 20 is provided with an extension 68 having a tapering recess 69. Pivoted to the standard 20, as at 70, is an arm 71 the free end of which extends inwardly and is provided with a tapered toe 72 adapted to coöperate with the recesses 69. Also pivoted on the frame, on the pivot 63, is a presser bar 73 having at its free end an offset which preferably takes the form of an anti-friction roller 74. A stem 75 passes freely through alined apertures in lugs 76 on the arm 71 and bar 73 and is held in position by nuts 77 screwing on the ends of the stem. Reacting between the lugs 76 and coiled about the stem 75 is an expansion spring 78. A transverse shaft 79 is journaled on the standards and fixed to this shaft is a gear 80 which meshes with and is driven by the pinion 56, the said gear being so related to the gear 54 as to make two revolutions to each revolution of the gear 54, and one revolution to each backward or forward movement of the rack 65. Fixed to the shaft 79 inside the standard 20, as shown in Figs. 1, 3 and 4, is a cam disk 81, the major portion of whose periphery is concentric with the shaft 79 but is provided at a suitable point with a depression 82 providing a cam shoulder 83. The recesses 69 are so positioned that the frame is locked by the mechanism described just as the platens come into exact register with the type forms.

The sequence of movements is as follows: In Fig. 1 the platens are shown in their retracted positions. As the gear 54 turns continuously in the direction of the arrow one of the pins 55 thereof engages the slot 53 in the path of the same thereby turning the disk 52 and consequently the platen carrying frame forward or in the direction of the arrow A thereby moving the platens into register with the succeeding type forms. At the end of this movement the disk 52 is held against further rotation by the coöperation of one of the flanges 62 with the concentric concave portion of the disk and the cam shoulder 83 engaging the roller 74 lifts the bar 73 and, through the medium of the spring 78, thrusts the locking toe 72 upwardly into engagement with the recess 69 which has by the rotation of the frame been moved into position in the path of the toe. While the disk 52 is prevented from rotating by the gear flange 62 still, as the gear 54 continues its rotation there would be a tendency to jar or vibrate the disk and consequently the platens. This is obviated by the locking device, as owing to the tapering formation of the toe and recess and by reason of the spring 78 the toe is wedged tightly into the recess so as to lock the rotatable frame rigidly against movement. Just as the frame is locked the rack 65, moving in the direction of the arrow B, Fig. 1, engages the pinion 51 and turns the shaft 23 forward in the direction of the arrow C, through an angle of about 120 degrees. At the end of the first half of this movement of the shaft the parts assume the positions shown in Fig. 6, the toggle connections being straightened and thrusting the platens outwardly into printing position so that they coöperate with the forms as shown in dotted lines in Fig. 3. The end half of the movement of the shaft breaks the toggle joints and withdraws the platens into the positions shown in Fig. 7. During this forward movement of the shaft 23, the concentric portion of the cam 81 moves past the roller 74 thereby holding the toe in its locking position until the platens have been advanced and retracted, when the depression 82 comes under the roller 74 permitting the bar 73 and arm 71 to drop and withdraw the locking toe. The other pin 55 now moves into engagement with the succeeding slot of the disk 52 imparting a further forward movement to the platen frame and carrying the platens to new positions, and at the end of this movement the frame is again locked by the toe 72, and the segmental rack 65 being moved backward or in a direction reverse to that indicated by the arrow B, rocks the shaft 23 in the direction indicated by the arrow D, Figs. 1 and 7, through an angle of 120 degrees. As before the first half of this movement straightens the toggles, moving the platens into the printing positions, shown in dotted lines in Fig. 3 and also in full lines in Fig. 6, the last half of the movement retracting the platens to the positions shown in Fig. 1, when the lock is again released.

Any suitable means may be employed for feeding the paper to the press such as that shown in Figs. 1, 3 and 4 and which forms the subject matter of an application for patent filed by me June 27, 1904 and bearing Serial No. 214,230. Briefly described such feeding mechanism comprises the following construction. A suitable frame 84 is mounted upon the standards 20, 21, and has journaled thereon a transverse shaft 85 having keyed to one end a ratchet wheel 86. A yoke 87 is loosely pivoted on the shaft 85 and carries a pawl 88 coöperating with the ratchet wheel. The yoke 87 has an outwardly extending pin 89 to which is pivoted one end of a pitman 90 whose other end is pivotally connected to a crank pin 91 secured to the shaft 79. Suitably journaled on the frame 84 is a pair of feed rollers 92 and 93 designed to advance the paper from the roll of paper 94. Motion is communicated to these rollers through the medium of a gear 95 fixed upon the shaft 85 and meshing with a pinion 96 on the adjacent end of the shaft of the roller 92, the opposite ends of the roller shafts being provided with intermeshing pinions 97.

The roll of paper is carried by a shaft 98 suitably journaled on the frame 84. Suitably secured on the frame 84 in advance of and parallel with the feed rollers 92 and 93 is a stationary cutter blade 99 to one end of which is pivoted, as at 100, a cutter blade 101. Fixed to the end of the blade 99 opposite the pivot of the cutter 101, is an upstanding arm 102 to the upper end of which is attached one end of a contractile spring 103, whose other end is attached to the free end of the cutter blade 101, as shown in Fig. 4. This spring is designed to elevate the blade 101 after the cutting operation and to maintain the same in its normal elevated position. Pivoted on the end of the blade 99, adjacent the arm 102, is a spindle 104, to which is attached a lever 105 whose free end is provided with an anti-friction roller 106 adapted to engage the upper edge of the cutter blade 101. The end of the spindle 104 extends in advance of the cutter, as shown in Fig. 3, and has fixed thereto a tripping finger 107 designed to be engaged by each platen, as it moves into position to receive a sheet of paper, to operate the cutter to sever the sheet from the roll.

In order to prevent the lifting up of the rear edge and displacement of a sheet upon the withdrawal of the cutter blade upon the severing of the paper, I provide a sheet holder or clamp for holding the sheet until the platen grippers, hereinafter described, have taken the sheet. This clamp comprises a stationary plate 108 suitably secured to the under face of the blade 99 and a coöperating movable plate 109 parallel with the plate 108 and carried by a spring arm 110 secured to a lug 111 mounted on the blade 99. Attached to the movable cutter blade 101 is a spring arm 112 which is bent in the present instance in the form of a loop the free end of the same being bent downwardly into such position as to be moved into engagement with the spring arm 110 when the cutter blade 101 is lowered.

When the blade 101 is lowered by the engagement of a platen with the finger 107 the free end of the spring 112 engages the upper face of the arm 110 and presses the movable clamp plate 109 into engagement with the plate 108. This action bends the spring 112 and puts it under tension to such an extent that upon the elevation of the cutter blade the end of the spring continues to hold the movable clamping member in its clamping position until after the partial elevation of the cutter blade and until the platen grippers grip the sheet.

Suitably journaled on the frame 84 at the rear of the feed rollers is a shaft 113 which is provided with a pair of toothed wheels 114 spaced apart a suitable distance and one of which is shown in Fig. 3. The toothed wheels engage and reciprocate a pair of strips 115 which are suitably supported on the frame and adapted to reciprocate in advance of the cutter and over the platen as shown in dotted lines in Fig. 3. The shaft 113 is oscillated to reciprocate the strips 115 through the medium of a suitable train of gearing 116, shown in Fig. 3, and deriving motion from a gear 117 fixed on a sleeve 118 loose on the shaft 85. One arm 119 of the yoke 87 is fixed to the sleeve 118. The shaft 79 being driven continuously in one direction an intermittent rotary motion will, through the pawl and ratchet mechanism, be imparted to the shaft 85, and this rotation will be transmitted and increased through the gearing to the feed rollers and cause the paper strip to be fed between such rollers a distance depending on the throw of the crank pin 91. While an intermittent rotary motion is imparted to the shaft 85, owing to the attachment of the yoke arm 119 to the loose sleeve 118, the latter has imparted to it an oscillatory movement, thereby effecting, through the medium of the gear train 116 the reciprocating movement of the strips 115.

Referring to Figs. 8 to 11, it will be observed that the front and rear edges of each platen 34 is formed with a dovetailed groove 120 in which is slidably mounted at each end the complementary shaped rib 121 formed on a vertical plate 122. The pair of plates 122 at each end of the platen are provided at the outer and upper corners with upstanding ears 123 and pivoted in these ears and extending across the platen is a gripper 124. The grippers are pivoted by means of outwardly extending lugs 125. Fixed to each gripper 124 beyond one edge of the platen is an arm 126 and the arms of each pair of grippers associated with the platen extend in opposite directions, as shown in Figs. 8 and 9. Attached to the upper end of each arm 126 in advance of the pivot of its gripper is a contractile spring 127 whose other end is attached to an extension 128 formed on the plate 122. When the gripper is moved on its pivot the upper end of the spring 127 is carried past the center of oscillation, thereby holding the bar in its raised position, such position being defined by a stop 129 fixed to the plate 122 and engaged by the arm when the bar is raised. The pivot lugs 125 of each gripper are provided with axial openings (not shown) into which extend the pivots 130 (shown in dotted lines in Fig. 8) of a blade 131 which, as shown in Fig. 8, extends across the platen and rests upon the latter under the gripper 124, as shown in Fig. 11.

Each blade 131 is provided at its end adjacent the arm 126 of the associated gripper, with a rearwardly extending finger 132. The opposite sides of the platen on the under face of the latter are provided with recesses 133, as shown in Fig. 11, adapted to be engaged by pins 134 slidably mounted in lugs 135 formed on the inner face of each extension 128. Coiled about each pin is an expansion spring 136 which reacts against the lower lug 135 and a shoulder 137 formed on the pin 134. These springs 136 force the pins into engagement with the recesses and hold the slide plates 122 in adjusted positions. By disengaging the pins from the recesses the grippers together with the blades 131 may be adjusted along the platen in accordance with variations in the size of the sheets being delivered to the platens. Mounted on the standards 20 and 21 in advance of the paper feeder and extending transversely of the press is a bar 138 (Figs. 3 and 4) on which is adjustably secured a pair of trips or cams spaced apart on the bar so as to co-operate with the arms 126 when the grippers are in their open positions and close the same on the sheet after the latter is delivered to the platen. These cams are constructed as shown in Figs. 4, 9 and 10, consisting of brackets, 139, secured on the bar 138 by screws 140 and having inwardly extending toes 141 which when the grippers are in the dotted lines position Fig. 9, and the platen is moved outwardly at the feeding point are engaged by the inclined faces 142 of the arms 126 so as to move the grippers on their pivots to grip the sheet.

Each platen, as the platen carrying frame is intermittently rotated, advances from the feeding point to the type forms in succession and after receiving an impression finally from the form 43, at the next intermittent rotary motion is advanced to the discharge point and as the platens are moved outwardly to printing positions discharges its sheet. This discharge is accomplished by the following means: Attached at its ends to the standards 20 and 21 at the discharge point, is a cross bar 143, Figs. 1, 3, and 11, on which is adjustably secured, (as by set-screws, one of which is shown in Fig. 10 and designated 144,) a pair of brackets 145. Each bracket is provided with a shoulder 146 and a toe 147 extending beyond the shoulder, as shown in Figs. 10 and 11, and as the platen is moved outwardly into printing position at the discharge point, the arms 126 engage the shoulders 146 and after the grippers are moved far enough to release the sheet the fingers 132 of the blades 131 come into engagement with the toes 147 thereby rocking the blades on their pivots and lifting the edges of the sheet from the platen, so as to free the sheet in the event that the latter adheres to the platen, the sheet then sliding down the inclined face of the platen on to the fly 148. The grippers are turned far enough to throw the springs 127 past the pivots of the grippers so that they remain in their open positions until closed by the closing cams at the feeding point, but the blades 131 as soon as the platens are withdrawn preliminary to being advanced to the next point, fall by gravity so as to rest on the platen as shown in Fig. 11.

The operation of the press in connection with the feeding and discharge of the sheets will now be understood. As each platen is being advanced to printing position at the feeding point, a strip of paper is fed forward by the feeding rollers 92 and 93 together with and resting on the paper supporting strips 115. Just before the platen reaches the outward limit of its movement, the strips 115 are retracted permitting the sheet to rest on the platen and also at its side edges on the blades 131. As soon as the strips 115 have been withdrawn, the platen engages the finger 107 actuating the cutter blade 101 to sever the sheet, the clamp plate 109 holding the cut edge of the latter to maintain the same in position on the platen until the grippers 124 take the same. During the end of the outward movement of the platen the cam toes 147 are engaged by the beveled faces 142 of the gripper arms, thereby closing the grippers against the sheet. The platen is then retracted and as it begins to move inwardly the finger 107 is released permitting the spring 103 to elevate the blade and release the clamp 109. After receiving an impression from each type form, the platen finally reaches the discharge point and as it is moved outwardly to printing position, the grippers are opened by the cam shoulders 146 and then the sheet is freed by the blades 131 as heretofore described.

A suitable delivery mechanism is shown in Figs. 1, 3, 10, 15, 16 and 17. As shown in Figs. 3, 15 and 16, the fly 148, consists of suitable fingers fixed to a bar 149 carried by the hub 150 of a segmental gear 151 which is loosely mounted on the shaft 49 of the inking mechanism associated with the printing form 43. The gear 151 is oscillated by a segmental gear 152 fixed to the shaft 47 of the same inking mechanism, and the movement of the gears is so timed as to present the fly to the platen, as shown in Fig. 10, as the sheet slides from the latter. Extending outwardly from the frame of the press, Figs. 3 and 17, are brackets 153 supporting a pair of suitably spaced parallel bars 154 from which the fly board 155 is hung. This fly board is provided with a pair of rods 156, one located near each end of the same, and attached to the ends of the rods 156 are the lower ends of coiled springs 157 whose upper ends are attached to the bars 154. By means of this arrangement the fly board is held in proper position with relation to the fly and gradually sinks by gravity as the sheets accumulate thereon, owing to the yielding of the springs, so that that relation is constant.

In connection with the grippers of the platens, I preferably employ auxiliary clamping devices which are associated with the type forms and adapted to coöperate with the platen grippers to hold the sheet, while the impression is being made, at all four of its edges. Referring to Figs. 12, 13 and 14, it will be observed that the chase 158 is provided with a groove 159 at each side. Located in the grooves are slides 160 adapted to be held in adjusted position by set screws 161. Pivotally mounted on each opposite pair of slides 160 and extending across the chase is a clamp 162 provided with an inwardly extending offset portion 163. Fixed to each end of each clamp is a finger 164, the fingers of each clamp extending away from those of the other clamp. Attached to each finger 164 is a leaf spring 165 whose free end rests upon the chase and which tends to hold the clamps depressed. The inking rollers 44 do not interfere with the clamps 162 as they travel back and forth over the type, as their cores 166 are reduced so as to clear the fingers 164, as shown in dotted lines, Fig. 13.

The operation of the chase clamps, which by reason of the adjustability of the slides 160, may be adjusted in accordance with variations in the size of the forms, will be apparent from Fig. 13. As the platen is thrust outwardly against the type, it engages the fingers 164 rocking the clamps 162 on their pivots so that they press the front and rear edges of the sheet firmly against the platen, thereby preventing the sheet from sagging at such edges and being smeared. The other edges of the sheet are of course held by the platen grippers so that during the time of the impression the sheet is clamped at all four of its edges. As the platen is retracted the clamps 162 are returned to their original positions.

Having described my invention, what I claim, and desire to secure by Letters Patent of the United States, is—

1. In a multi-color press, the combination with a plurality of type beds, of a shaft, a rotatable frame on the shaft, a plurality of platens carried by the frame, a disk fixed to the frame, a cam wheel coöperating with the disk to move the frame intermittently so as to bring the platens successively into register with the type beds, means for rocking the shaft, and connections between the shaft and the platens whereby when the platens are in register and the shaft is rocked they are moved outwardly and then withdrawn.

2. In a multi-color press, the combination with a plurality of type beds, of a rotating frame carrying a plurality of platens, a disk fixed on the rotating frame and having equidistant slots at its edge, a driving wheel provided with diametrically disposed cams adapted to engage the slots successively to move the frame intermittently and bring the platens successively into register with the beds, and means for moving the platens to take an impression when the platens are in register.

3. In a multi-color press, the combination with a plurality of type beds, of a shaft, a frame rotatably mounted on the shaft and carrying a plurality of platens, means for rotating the frame independently of the shaft to bring the platens successively into register with the type beds, connections between the shaft and the platens, and means for turning the shaft, whereby through the medium of the connections the platens are moved to take an impression when in register with the type beds.

4. In a multi-color press, the combination with a shaft having type beds grouped about the same, of a frame coaxial with the shaft, platens movably mounted on the frame, a positive driving connection for moving the frame intermittently to advance the platens successively into register with the type beds, means for moving the shaft between the intermittent movements of the frame and while the platens are in register with the type beds, and means controlled by the movement of the shaft for moving the platens to take an impression from the type beds.

5. In a multi-color press, the combination with a shaft having type beds grouped about the same, of a rotating frame carrying a plurality of platens, a driving connection for moving the frame intermittently to bring the platens successively into register with the type beds, means controlled by the movement of the shaft for moving the platens to take an impression from the type beds when in register therewith, and an independent driving connection for rotating the shaft between the intermittent movements of the frame.

6. In a multi-color press, the combination with a shaft having type beds grouped about the same, of a frame coaxial with the shaft, platens pivotally mounted on the frame, means for driving the frame intermittently to bring the platens successively into register with the type beds, toggle connections between the shaft and the platens, and independent driving means for rotating the shaft between the intermittent movements of the frame.

7. In a multi-color press, the combination with a shaft having type beds grouped about the same, of a frame coaxial with the shaft, platens pivoted on the frame, a disk fixed to the frame and provided with slots, a wheel provided with a pin adapted to engage the slots to rotate the frame intermittently to bring the platens successively into register with the type beds, toggle connections between the shaft and the platens, and means for rotating the shaft between the intermittent movements of the frame to straighten the toggle connections and move the platens into contact with the type beds with which they are in register.

8. In a multi-color press, the combination with a shaft having type beds grouped about the same, of a frame coaxial with the shaft, platens pivoted on the frame, a disk rigid with the frame and having a plurality of tangential slots, a driving wheel provided with a pair of diametrically disposed pins adapted to coöperate in succession with alternate slots to impart a rotary intermittent movement to the frame and bring the platens successively into register with the type beds, toggle connections between the shaft and the platens, a pinion on the shaft, and a reciprocating rack adapted to move into and out of engagement with the pinion between the intermittent movements of the frame.

9. In a multi-color press, the combination with a plurality of type beds, of a shaft, a frame rotatably mounted on the shaft and carrying a plurality of platens, means for rotating the frame independently of the shaft to bring the platens successively into register with the type beds, means for then locking the frame against movement, toggle connections between the shaft and the platens, and a driving connection for turning the shaft independently of the rotating frame to operate the toggle connections and move the platens to take an impression when the latter are in register with the type beds and the frame is locked.

10. In a multi-color press, the combination with a shaft having type beds grouped about the same, of a frame coaxial with the shaft, platens movably mounted on the frame, a positive driving connection for moving the frame intermittently to bring the platens successively into register with the type beds, a spring pressed bar for locking the frame between the intermittent movements thereof, means controlled by the movement of the shaft for moving the platens to take an impression from the type beds when in register therewith, and means for rotating the shaft while the frame is locked.

11. In a multi-color press, the combination with a shaft having type beds grouped about the same, of a frame coaxial with the shaft, platens pivoted on the frame, a disk rigid with the frame and having a plurality of slots, a driving wheel provided with means coöperating with the slots to impart a rotary intermittent movement to the frame to bring the platens successively into register with the type beds, a locking bar, a lever having a spring connection with the locking bar, a cam reacting against the lever to press the locking bar into engagement with the frame between the intermittent movements of the latter, toggle connections between the shaft and the platens, a pinion on the shaft, and a reciprocating rack adapted to engage the pinion and rock the same while the frame is locked to move the platens into and then out of contact with the type beds.

12. In a multi-color press, the combination with stationary type beds, of a frame provided with a plurality of platens, means for moving the frame intermittently to bring the platens successively into register with the beds, a pivoted locking toe, and means for yieldingly forcing the locking toe into engagement with the frame and holding it there between the intermittent movements of the frame, and means for moving the platens while the frame is locked to take an impression from the beds with which they are in register.

13. In a multi-color press, the combination with stationary type beds, of a frame provided with a plurality of platens, means for moving the frame intermittently to bring the platens successively into register with the beds, a pivoted locking bar provided with a toe adapted to engage the frame, a pivoted lever having a spring connection with the locking bar, and a cam reacting against the lever to press the locking bar into engagement with the frame to hold the latter between the intermittent movements thereof, and means for moving the platens while the frame is locked to take an impression from the beds with which they are in register.

14. In a multi-color press, the combination with a frame carrying a plurality of type beds grouped at equal radial distances from a common center, of a shaft concentric with the general outline of the beds, a frame coaxial with the shaft and carrying a plurality of pivoted platens, a disk fixed on the platen frame and having equi-distant slots at its edge, a driving wheel provided with cams adapted to engage the slots to turn the platen frame intermittently and bring the platens successively into register with the beds, toggle connections between the shaft and the platens, a pinion fixed on the shaft, and a reciprocating rack engaging the pinion in alternation with the intermittent movement of the platen frame to rock the shaft, and whereby the direction of the rotation of the shaft is reversed after each movement of the frame and the platens moved outwardly to take an impression and then withdrawn.

15. In a press, the combination with a type bed and a platen, one of which elements is movable, means for feeding paper from a strip to the movable element, and means actuated by the movable element to sever into a blank the paper delivered to such element before the printing operation.

16. In a press, the combination with a type bed, of a plurality of coöperating platens movable successively into register with the type bed, means for feeding paper in a strip to each platen at a certain point in its movement, and a cutter actuated by the platen before it reaches its position of register to sever the paper fed thereto.

17. In a press, the combination with a type bed, of a plurality of coöperating platens, means for moving the platens forward and successively into register with the type bed, means for feeding paper in a strip to each platen at a certain point of its movement, and a cutter actuated by the platen during its printing movement at such point to sever the paper fed thereto.

18. In a press, the combination with a type bed and a platen, one of which elements is movable, of means for feeding paper in a strip to the platen, a pivoted cutter blade, and a finger engaged by the movable element to move the cutter blade to sever the strip.

19. In a press, the combination with a type bed, of a cooperating platen, means for moving the platen to bring it into register with the type bed, paper feeding mechanism for automatically supplying the platen with a strip of paper as it passes a certain point in its movement to register, a cutter blade, and a finger adapted to be engaged by the platen during its printing movement at such point and after the strip is delivered thereto to sever such strip.

20. In a press, the combination with a plurality of type beds, of a plurality of coöperating platens, means for moving the platens to bring them successively into register with the type beds, a common paper feeding mechanism for automatically supplying each platen with paper from a strip as it passes a certain point in its movement, a pivoted cutter, a finger provided with an arm to move the cutter and engaged by each platen after the paper is delivered thereto to sever the strip, and means for moving the platens to take an impression from the type beds.

21. In a press, the combination with type bed, of a coöperating platen provided with paper gripping means, means for feeding paper from a strip to the platen, means for severing the paper delivered to the platen and a clamp for holding the rear edge of the severed sheet until the latter is taken by the platen gripping means.

22. In a press, the combination with a type bed, of a coöperating platen provided with paper gripping means, means for feeding paper from a strip to the platen, a cutter blade actuated by the platen to sever from the strip the paper delivered to the platen, and a clamping member for holding the rear edge of the severed sheet until the latter is taken by the platen gripping means.

23. In a multi-color press, the combination with a plurality of type beds, of a plurality of coöperating platens provided with paper gripping means, means for moving the platens to bring them successively into register with the type beds, paper feeding mechanism common to the platens for automatically supplying each platen with a sheet of paper from a strip as it passes a certain point in its movement, a pivoted cutter, a finger provided with an arm to actuate the cutter and engaged by each platen successively during its movement and after the paper is delivered thereto to sever such paper from the strip, a clamp actuated by the movement of the cutter to hold the severed sheet until it is taken by the platen gripping means, and means for moving the platens to take an impression from the type beds.

24. In a press, the combination with a type bed, of a coöperating platen provided with grippers, intermittently operating paper feeding means, a reciprocating paper support, means for advancing the support across the face of the platen during the operation of the paper feeding means and with the paper delivered by the latter thereon and then retracting the support while the paper feeding means are at rest, and means for actuating the platen grippers.

25. In a press, the combination with a plurality of type beds, of a plurality of coöperating platens, means for moving platens to bring them successively into register with the type beds, paper feeding mechanism common to the platens for automatically supplying each platen with a sheet of paper from a continuous strip as it passes a certain point in its movement, a reciprocating carrier adapted to be advanced with the paper as the latter is fed to the platen and then withdrawn, a cutter for severing the sheet upon the withdrawal of the carrier, and means for moving the platens to take an impression from the type beds.

26. In a printing press, the combination with a movable platen, a type bed, and means for moving the platen into register with the type bed and then to a discharge position, of means mounted on the platen and on which the paper rests and which when moved is adapted to lift the paper from the platen to free the same, and a trip for moving such means when the platen reaches its discharge position.

27. In a printing press, the combination with a movable platen and a type bed, means for moving the platen in register with the type bed and then to a discharge position, of plates loosely pivoted on the ends of the platen and normally resting upon the platen and under the blank carried by the platen, and means for moving the plates to free the blank from the platen at the discharge position.

28. In a printing press, the combination with movable platens, and a type bed with which they are successively brought into register by a movement continuously forward, means for moving the platens outwardly into coöperation with the type bed at each registration, of grippers pivoted on the ends of the platens, a pivoted plate associated with each gripper and normally resting on the platen and under the blank carried by the platen, and cams so located that when each platen reaches its discharge position and is moved outwardly the grippers thereof will be opened to release the blank and thereafter the plates will be moved to free the blank from the platen.

29. In a printing press, the combination with a movable platen, of a type form with which the platen coöperates and which is provided with a clamp adapted, when the platen is moved against the form, to engage the blank on the platen.

30. In a printing press, the combination with a movable platen provided with paper clamps at its ends, of a type form provided at its sides with clamps having fingers adapted to be engaged by the platen when the latter is moved against the form to press the clamps against the edges of the blank carried by the platen.

31. In a printing press, the combination with a movable platen provided with adjustable paper clamps at its ends, of a type form provided at its sides with pivoted adjustable clamps having fingers adapted to be engaged by the platen when the latter is moved against the form to press the clamps against the side edges of the blank carried by the platen.

In testimony whereof I affix my signature in presence of two witnesses.

CHARLES WILLIAMS.

Witnesses:
 ARTHUR B. SEIBOLD,
 ELIZABETH MOLITOR.